United States Patent
Schenk et al.

(10) Patent No.: US 10,358,373 B2
(45) Date of Patent: Jul. 23, 2019

(54) METHOD FOR PRODUCING A PORE-CONTAINING OPAQUE QUARTZ GLASS

(71) Applicant: Heraeus Quarzglas GmbH & Co. KG, Hanau (DE)

(72) Inventors: Christian Schenk, Ingelheim (DE); Gerrit Scheich, Seligenstadt (DE); Nadine Tscholitsch, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 57 days.

(21) Appl. No.: 15/602,919

(22) Filed: May 23, 2017

(65) Prior Publication Data
US 2017/0341968 A1    Nov. 30, 2017

(30) Foreign Application Priority Data
May 24, 2016   (EP) .................................... 16171047

(51) Int. Cl.
C03B 19/06       (2006.01)
C03B 20/00       (2006.01)
(52) U.S. Cl.
CPC ............ C03B 20/00 (2013.01); C03B 19/066 (2013.01); *C03B 2201/02* (2013.01)
(58) Field of Classification Search
None
See application file for complete search history.

(56) References Cited

U.S. PATENT DOCUMENTS 4,042,361 A    8/1977   Bihuniak et al.
6,380,110 B1 *  4/2002   Werdecker .......... C03B 19/1065
                                                       501/54

(Continued)

FOREIGN PATENT DOCUMENTS

DE    3814863 A1    11/1989
DE    10243953 A1    4/2004

(Continued)

OTHER PUBLICATIONS

Extended Search Report dated Dec. 5, 2016 in EP Application No. 16171047.0.

*Primary Examiner* — Lisa L Herring (57) ABSTRACT

A method for producing a pore-containing opaque quartz glass includes: (a) producing porous $SiO_2$ granulate particles from synthetically produced $SiO_2$, (b) thermally densifying the $SiO_2$ granulate particles to form partly densified $SiO_2$ granulate particles, (c) forming a dispersion from the partly densified $SiO_2$ granulate particles, (d) comminuting the partly densified $SiO_2$ granulate particles to form a slip containing comminuted $SiO_2$ granulate particles, (e) shaping the slip into a shaped body and forming a porous $SiO_2$ green body with a green density rG, and (f) sintering the $SiO_2$ green body into opaque quartz glass. To produce opaque quartz glass that is also suited for the use of spray granulate, during step (b), partly densified $SiO_2$ granulate particles are produced with a specific surface BET-(A) between 0.025 and 2.5 $m^2/g$, and during step (d), comminuted $SiO_2$ granulate particles are produced with a specific surface BET-(B) between 4 and 10 $m^2/g$.

16 Claims, 3 Drawing Sheets

(56) References Cited

U.S. PATENT DOCUMENTS

| | | |
|---|---|---|
| 9,533,890 B2 | 1/2017 | Weber et al. |
| 2002/0134108 A1 | 9/2002 | Werdecker et al. |
| 2003/0119648 A1* | 6/2003 | Werdecker .............. C03B 19/06 501/32 |
| 2003/0121283 A1* | 7/2003 | Yu ........................... C03B 19/06 65/17.2 |
| 2007/0082149 A1* | 4/2007 | Linnot .................... B28B 1/261 428/34.4 |
| 2010/0115996 A1* | 5/2010 | Werdecker .............. C03B 19/06 65/33.4 |
| 2015/0060918 A1* | 3/2015 | Shiobara ................. C08K 3/22 257/98 |
| 2016/0090319 A1 | 3/2016 | Hofmann et al. |

FOREIGN PATENT DOCUMENTS

| | | |
|---|---|---|
| DE | 10344189 A1 | 2/2005 |
| DE | 102012004564 A1 | 9/2013 |
| EP | 1148035 A2 | 10/2001 |
| EP | 1516864 A2 | 3/2005 |
| KR | 100716485 B1 | 5/2007 |
| WO | 8803914 A1 | 6/1988 |

\* cited by examiner

METHOD FOR PRODUCING A PORE-CONTAINING OPAQUE QUARTZ GLASS

BACKGROUND OF THE INVENTION

The present invention refers to a method for producing a pore-containing opaque quartz glass.

Opaque quartz glass contains small bubbles that produce light scattering and give the glass a translucent to whitish appearance. There are smooth transitions between opacity and translucency. Translucency designates the partial light transmission which is not so much based on optical absorption as on light scattering. Opacity is the reciprocal property of translucency. In this respect, opacity is a measure of the light impermeability of quartz glass.

Silica raw materials of natural or synthetic origin are used for producing opaque quartz glass. Those of synthetic origin are typically produced from organic silicon compounds that are converted by polymerization, polycondensation, precipitation or CVD methods into $SiO_2$. Fine dust particles of synthetic $SiO_2$, which are often called "$SiO_2$ primary particles", are here obtained as an intermediate product, end product or by-product.

In the sol-gel method, the typical mean particle sizes of these $SiO_2$ primary particles are in the range between 0.5 μm and 5 μm and are less than 0.2 μm in the case of flame hydrolysis. These are also called "$SiO_2$ nanoparticles" or "$SiO_2$ soot" in the technical literature. Due to their small particle size, their high specific surface area and low density, these primary particles are not free-flowing and show strong shrinkage when directly used in quartz glass production. As a rule, they are therefore granulated and pre-densified in advance.

Examples of suitable build-up or press granulation methods are roll granulation in a pan granulator, spray granulation, centrifugal atomization, fluidized-bed granulation, freeze granulation, granulation methods using a granulating mill, compaction, roller presses, briquetting, flake production, or extrusion.

During granulation discrete and rather large agglomerates, which are here called "$SiO_2$ granulate particles," or "granulate particles" for short, are formed by agglomeration of the $SiO_2$ primary particles. In their entirety the granulate particles form a porous "$SiO_2$ granulate". The porous $SiO_2$ granulate is free-flowing and has a bulk weight which is increased by comparison with the finely divided $SiO_2$ dust and can be further increased by way of thermal or mechanical treatment.

A method for producing closed-pore opaque quartz glass is known from U.S. Pat. No. 4,042,361 A. The publication describes the manufacture of a quartz glass crucible of opaque quartz glass by way of a slip casting method using synthetic quartz glass granules. The quartz glass granules are made from pyrogenically produced $SiO_2$ soot, as accrues as filter dust in the flame hydrolysis of a silicon compound, by preparing a gel from the loose $SiO_2$ soot first by mixing into water and stirring, the gel having a solids content varying between 30% by wt. and 45% by wt., depending on the type and speed of the stirring process. The fragments obtained after drying of the gel are sintered at temperatures between 1150° C. and 1500° C. into dense, coarse quartz glass granules. These are subsequently fine-milled in a dispersion liquid into grain sizes between 1 μm and 10 μm. The slip produced thereby is cast into a crucible mold, and the layer adhering to the edge of the crucible is dried so as to form a porous green body. The green body is subsequently vitrified at a temperature between 1800° C. and 1900° C. into the quartz glass crucible.

The known method requires multiple method steps that partly entail a high expenditure of energy, such as for instance the vitrification of the coarse-grained gel fragments into the desired quartz glass granules. In the comminuting and milling processes, there is the fundamental risk of contamination of the milled material and of dispersion caused by abrasion from the milling tool, especially when the milled material has a high mechanical strength.

DE 102 43 953 A1 discloses a method for producing opaque quartz glass according to the above-mentioned type. As starting material, a $SiO_2$ granulate of porous $SiO_2$ granulate particles is employed that are formed from agglomerates of nanoscale, amorphous, synthetically produced $SiO_2$ primary particles having a mean primary particle size of less than 100 mm.

To produce the $SiO_2$ granulate, a roll granulation method is employed, resulting in granulate particles with particles in the range between 100 μm and 500 μm and with a specific BET surface area of about 45 $m^2/g$. Thermally consolidated porous "fine granulate" with a specific BET surface area of about 30 $m^2/g$ and a tamped density of about 1.3 $g/cm^3$ is produced from this raw granulate by treatment in a rotary furnace at a temperature of 1200° C. in chlorine-containing atmosphere. By heating to an elevated temperature of 1450° C., a further part of the raw granulate is completely vitrified into synthetic quartz glass granules having a specific BET surface area of about 1 $m^2/g$. The particles of the fine granulate and of the quartz glass granules have a mean size (median or $D_{50}$ value) of less than 160 μm. The $D_{50}$ value represents the particle size that is not reached by 50% of the cumulative particle volume.

A preparation of a 50:50 mixture of $SiO_2$ fine granulate and quartz glass granules is stirred into deionized water, whereby a liter weight of the dispersion of 1.6 kg/l is set. In a ball mill lined with polyurethane, the dispersion is homogenized for about one hour and is subsequently cast into a porous plastic mold in which dehydration and body formation take place to form an open-pore green body. The drying process already yields a firm bond between the individual granulate particles and leads to a densification and consolidation of the green body, which is intended to facilitate subsequent sintering.

DE 103 44 189 A1 describes a method for producing a cast part of opaque quartz glass by way of a slip casting method. The $SiO_2$ slip is cast into a liquid-impermeable mold and a frozen blue body is first formed, the blue body being subsequently dried and sintered. The mold may be a membrane mold of vacuum-shaped silicone.

The granulation of $SiO_2$ primary particles normally yields an undesired fine fraction with granulate which is not agglomerated or is insufficiently agglomerated. This fraction causes problems in the subsequent processing of the granulate. This drawback is avoided by spray granulation, as is for instance known from EP 1 148 035 A2. The predetermined size of the granulate particles can here be set relatively precisely by separating the fine fraction with a diameter below 100 μm directly in the granulation process by means of a cyclone.

Spray granulate particles have a spherical morphology and are present as an agglomerate of individual spherical $SiO_2$ primary particles that can be crushed and comminuted by applying a slight mechanical pressure. They typically have a hollow space and a mean grain diameter in the range of 100 μm to 300 μm. The specific surface (according to BET) of spray granulate is normally around 30 m²/g. The process-specific hollow-space formation and the low densification in the spray granulate lead during slip formation to a thickening of the slip as the moisture bound in the hollow spaces and in the porosity of the granulates must be compensated. The accompanying risk of lump formation is avoided by low solids contents of the slip.

On the other hand, spray granulation allows inexpensive production together with high reproducibility of the properties of the spray granulate, especially of the diameter of the granulate particles. It would therefore be desirable to avoid such drawbacks.

It is therefore an objective of the present invention to provide a procedure for producing opaque quartz glass by way of slip casting that is also suited for the employment of spray granulate.

BRIEF SUMMARY OF THE INVENTION

The present invention refers to a method for producing a pore-containing opaque quartz glass. The method comprises the following steps:

(a) producing porous $SiO_2$ granulate particles by agglomeration of amorphous, synthetically produced $SiO_2$ primary particles, (b) thermally densifying the $SiO_2$ granulate particles to form partly densified $SiO_2$ granulate particles, (c) forming a dispersion containing a dispersion liquid and partly densified $SiO_2$ granulate particles dispersed therein, (d) comminuting at least a part of the partly densified $SiO_2$ granulate particles in the dispersion to form a slip which contains comminuted $SiO_2$ granulate particles, (e) shaping the slip into a shaped body and removal of dispersion liquid to form a porous $SiO_2$ green body with a green density $\rho G$, and (f) sintering the $SiO_2$ green body into the opaque quartz glass.

According to the method of the present invention, (i) during thermal densification of method step (b) partly densified $SiO_2$ granulate particles are produced with a specific surface BET-(A) in the range of 0.025 and 2.5 m²/g determined by BET sorption measurement, and (ii) during comminution of method step (d) comminuted $SiO_2$ granulate particles are produced with a specific surface BET-(B) in the range of 4 and 10 m²/g determined by BET sorption measurement.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

The method according to the present invention comprises a slip method in which an intermediate product which is upstream of the quartz glass material is obtained in the form of a green body. As a rule, the green body has a shape close to the final contour of the quartz-glass molding to be produced. This is for instance a massive solid body, a hollow body or a layer on a substrate. The green body can be obtained by pouring out the dispersion into a mold. However, other processing methods are also suited for the dispersion, such as suction into a mold, immersion, injection, laying on (painting), troweling, stripping, pulling, doctoring, or the like.

The green body is dried and a substantially water-free molding is obtained therefrom. It is sintered into a gas-tight, mechanically stable molding of opaque quartz glass. The parameters suited for sintering (sintering temperature, sintering duration, atmosphere) have to be determined in simple tests. The molding obtained after sintering is present as a layer on a substrate, as a hollow body or as a massive molding. The pores contained therein act as optical defects in the quartz glass matrix and have the effect that the material seems to be opaque and obscure, depending on the layer thickness. The pores are as small as possible and are evenly distributed in the quartz glass material.

The method according to the invention differs from the procedure known from the prior art substantially in that both the starting material used and its further processing into the opaque quartz glass are optimized with respect to a high strength of the green body. More precisely, the invention aims at optimizing the so-called green strength of the green body. This strength substantially determines the way how the green body is handled, but also the final result after drying and sintering. The reason is that, like in the case of a green body weakened by stresses or crack formation during drying, a green body which is mechanically weak right from the beginning also presents the risk of cracks and breakage during sintering. This is particularly true for massive bodies of a large volume and for layers of opaque quartz glass with a thickness of more than 3 mm.

The optimization of the green strength makes technical demands on several parameters and process steps of the whole process chain, which demands result in the end in a slip which is "processable" in the sense that the green bodies obtained from the slip exhibit green strength under the macroscope. The most important ones of these parameters and process steps shall be discussed in more detail hereinafter:

1. Purity

Crystallization during sintering may lead to rejects of the sintered body. The tendency of quartz glass to crystallize is increasing in the presence of impurities, particularly in the presence of alkali impurities.

The method according to the invention proceeds from a slip of synthetically produced $SiO_2$ granulate particles. These consist of undoped or doped $SiO_2$. Doped $SiO_2$ may contain other oxidic, nitridic or carbidic components in an amount of not more than 3% by wt.

Apart from possible dopants, the $SiO_2$ content of these particles is preferably at least 99.99% by wt. Undesired impurities are contained in the sub-ppm range at the most. Preferably, the total impurity content of Li, Na, K, Mg, Ca, Fe, Cu, Cr, Mn, Ti, Al, Zr, Ni, Mo and W is not more than 0.5 wt. ppm. The solids content of a suspension produced by using such particles consists of at least 99.99% by wt. of $SiO_2$. Binders or similar additives are not provided in the slip. There is no cristobalite amount in the dried green body. This prevents any weakening of the glassy structure of green body and glass.

2. Properties of the $SiO_2$ Particles in Dispersion and Slip

The preparation of opaque quartz glass by using a slip of synthetically produced, amorphous $SiO_2$ granulate particles is known in principle, e.g. from the above-mentioned prior art. The starting point is here a dispersion which contains completely vitrified and thermally consolidated $SiO_2$ granulate particles, and the aim is to change as little as possible the particle size distribution given in the dispersion when the dispersion is homogenized. It is therefore recommended that a later comminution of the granulate particles in the slip should be omitted, if possible, or whenever a wet grinding process is used, a grinding process should be employed that is as gentle as possible so as to prevent, if possible, the porous granulate particles from disintegrating into their agglomerate constituents of $SiO_2$ nanoparticles.

By comparison, in the method according to the invention the comminution of the partly densified $SiO_2$ granulate particles is basically intended within the dispersion, the comminuting process being moreover so intensive that a noticeable reduction of the mean particle size is accomplished.

Preferably, the production of the granulate particles according to method step (a) is carried out by way of spray granulation.

Spray granulation allows inexpensive production together with high reproducibility of the properties of the spray granulate, specifically the diameter of the granulate particles. Spray granulate particles, however, normally show a spherical morphology, and they typically have a hollow space. This hollow-space formation and the low densification in the spray granulate lead during slip casting to a thickening of the slip because the moisture bound in the hollow spaces and in the porosity of the granulates must be compensated. In the method according to the invention these drawbacks are avoided by combining the specific settings of the BET surface areas of the granulate particles after thermal densification and after comminution.

The comminution of the initial $SiO_2$ granulate particles within the dispersion can for instance be carried out by way of ultrasound, but preferably by wet grinding, and it has several effects.

(a) On the one hand, fresh, reactive $SiO_2$ surface is continuously produced during comminution, and this surface can be changed by the dispersion liquid and can effect chemical physical interactions with other $SiO_2$ particles. Such molecular bonds contribute to the stabilization of the slip and to an increased green strength of the green body. In dispersions based on alcohol or water, the polar nature can further promote the interactions among one another.

(b) On the other hand, the fractured surfaces and fragments produced during comminution have normally no spherical morphology, as have for instance spray granulate particles, but they exhibit a non-spherical, rugged, preferably splintery morphology which is conducive to a dense planar agglomeration and to a mutual interlocking of the $SiO_2$ particles. This planar interlocking on freshly produced fractured surfaces of the $SiO_2$ particles forms a kind of "house of cards structure" in the green body, the structure enabling a high density of the green body (green density) and having a positive effect on the green strength. That is why the $SiO_2$ particles are present in the processable slip in the form of fragments of former granulate particles. Preferably, at least 80% of the $SiO_2$ particles, particularly preferably at least 90% of the $SiO_2$ particles, with a particle size of more than 5 μm have a splintery morphology.

3. Properties of the Sio2 Particles Before and After Comminution

In the manufacture of a processable slip by comminution of a $SiO_2$ granulate in the dispersion, the "grindability" of the $SiO_2$ granulate may pose problems.

(a) During grinding of a just mechanically densified granulate the agglomerates formed in the granulation process may disintegrate again. $SiO_2$ nanoparticles released in this process lead during production of the green body to a low green density that during drying and sintering may lead to increased shrinkage of the green body and to the formation of cracks. That is why the above-mentioned prior art recommends a homogenization of the dispersion that is as gentle as possible.

It has been found that such low-densified granulate particles cannot be comminuted to a sufficient degree into granulate-particle fragments. When the intensity of the comminuting process is low, the number of fractured surfaces formed is too small and the above-mentioned undesired high release of $SiO_2$ nanoparticles takes place at high intensity.

(b) In the method according to the invention, the $SiO_2$ granulate particles are therefore thermally pre-densified before comminution. However, the thermal partial densification (hereinafter also called "thermal pre-densification") does also not easily yield the desired result. Both an excessively low and an excessively high thermal consolidation may lead to an insufficient formation of fragments of the granulate particles, as characterize the processable slip, and which allow a green body with a high green strength in the form of a house of cards structure.

An inadequate thermal consolidation (the specific surface determined by BET sorption measurement before the thermal densification (here called BET-(A)) is greater than 2.5 $m^2/g$) leads to an enhanced release of merely agglomerated $SiO_2$ nanoparticles in the slip. An excessively high thermal consolidation (the specific surface BET-(A) determined by BET sorption measurement is smaller than 0.025 $m^2/g$) aggravates comminution and rather leads to abrasion than fragments, especially in cases where the densified granulate particles are spherical.

To produce a high proportion of broken granulate particles, partly densified $SiO_2$ granulate particles are started from, in which the specific surface BET-(A) determined by BET sorption measurement is in the range of 0.025 to 2.5 $m^2/g$, preferably less than 0.8 $m^2/g$ and particularly preferably less than 0.5 $m^2/g$. This small specific surface is a measure of the comparatively high density and the degree of thermal consolidation of the partly densified $SiO_2$ granulate particles, which are a precondition for their grindability and qualification for a processable slip.

The particle size distribution in the slip and particularly the proportion of the $SiO_2$ particles which are present in the form of fragments depends on the original particle size distribution prior to comminution and on the parameters such as duration and intensity of the comminuting process. A suitable measure for the definition of the particle size distribution is the BET surface (here called BET-(B)) that is present after the comminuting process. It has been found that slightly pre-densified granulate particles tend to have a great BET-(B) surface, which is due to the disintegration of agglomerates, and that the difference between the specific surfaces BET-(A) and BET-(B) is also great, for instance greater than 7 m²/g. On the other hand, after comminution very highly densified granulate particles have a comparatively small BET surface before and also after the comminuting process. Particularly, the difference between the specific surfaces BET-(A) and BET-(B) is comparatively small in these cases, for instance less than 4 m²/g.

In this respect pre-densified granulate particles that yield a processable slip show a typically different behavior. Although before comminution these granulate particles have a small BET-(A) surface, which may certainly be in the order of completely vitrified granulate particles (namely between 0.025 and 2.5 m²/g, as discussed above), their specific BET-(B) surface rises much more after the comminuting process than in the case of completely vitrified granulate particles, but less than in slightly pre-densified granulate particles and is in the end in the range between 4 and 10 m²/g. The difference between the specific surfaces BET-(A) and BET-(B) is preferably in the range of 4 to 7.5 m²/g. This effect may be attributed to the internal residual porosity of the granulate particles that pass to the broken surface due to comminution and provide additional surface at that place.

The comminuting or grinding process to form nonspherical, rugged, splintery SiO₂ particles for the purpose of forming a green body with a "house of cards structure" is therefore aggravated upon use of thermally poorly densified SiO₂ granules and also of highly densified SiO₂ granules.

(c) Since their grindability is aggravated and the grains in the grinding process rather abrade than can be comminuted, a round initial shape of the SiO₂ granulate particles with small aspect ratio is in the technical process rather less advantageous than a platelet- or flake-shaped initial shape of the granulate particles with an increased aspect ratio (>2). This can be taken into account by adapting the intensity of the comminuting step. Moreover, round SiO₂ particles turn out to be disadvantageous to the green strength also in the microstructure of the green body, which can be ascribed to the fact that they interconnect only cohesively and selectively at a few contact points.

4. Green Density and Green Strength

The green density after drying of the green body is considerably determined by the solids content of the slip in the shaping step and by the local distribution, specific surface area and morphology of the partly densified and comminuted SiO₂ granulate particles, and this, in turn, by the "grindability" of the partly densified granulate particles and their specific BET-(B) surface. Especially the interaction between grindability of the SiO₂ granulate particles and distribution and morphology of the fragments really generated during comminution leads to a processable slip which can be processed into a green body of adequately high density (green density $\rho G$) and green strength.

The solids content of the slip follows substantially from the weight percentage of the SiO₂ particles, which is preferably at least 70%, particularly preferably at least 75%. A comparatively high and therefore preferred green density in the range of $1.6<\rho G<1.9$ g/cm³ is indicative of a suitable distribution and morphology of the SiO₂ particles, as explained above, which leads to wedging or interlocking of the grains in the green body, which is often called "house of cards structure". The house of cards structure of the grains in combination with a high green density in the range can therefore be considered as a necessary condition for the green strength of the dried green body, which in turn is required for the further processing of the green body without any ensuing damage. An excessive amount of SiO₂ nanoparticles, as arises in inadequately pre-densified granulate in the comminuting step, leads to a reduced green density and may result in a low green strength of the green body.

Ideally, a processable slip contains 100% granulate particles, as defined above. A certain amount of up to not more than 30% by wt. of fully vitrified granulate particles may be harmless. Insufficiently densified granulate, however, is already unfavorably noticeable in small amounts (starting from about 20% by wt.).

In a preferred method variant, the comminuted SiO₂ granulate particles have a final particle size distribution, defined by a $D_{10}$ value $D_{10}(B)<5$ μm and a $D_{90}$ value$_{90}(B)$ <50 μm.

The final particle size distribution of the SiO₂ particles in the finished slip is composed of an amount of original, partly densified SiO₂ granulate particles (if present at all) and of particles resulting from abrasion and breakage of the partly densified SiO₂ granulate particles.

The particle size distribution in the slip and particularly the amount of the SiO₂ granulate particles present in the form of fragments is determined by the intensity of the comminution process according to method step (d). A measure of the intensity of the comminution process follows from the difference between the particle size distributions before and after comminution. To produce a high fraction of broken, partly densified SiO₂ granulate particles, one advantageously proceeds from an initial particle size distribution of the granulate particles, for which: $D_{10}(A)>15$ μm and $D_{90}(B)>105$ μm.

It has been found that the grindability of the partly densified SiO₂ granulate particles depends on the specific micropore surface. It is intended in a particularly preferred method variant that prior to the comminution according to method step (d) the SiO₂ granulate particles are partly densified at a temperature in the range of 800° C. to 1300° C. such that the partly densified SiO₂ granulate particles have a specific micropore surface determined by BET sorption measurement of less than 0.25 m²/g, preferably a micropore surface of less than 0.1 m²/g. Thus, of the specific (total) BET surface determined by BET sorption measurement, less than 0.25 m²/g (preferably less than 0.1 m²/g) accrues to the micropore surface.

The specific BET surface area is composed of the area proportions of open micropores and of the external surface of the granulate particles. The micropore surface refers to the contribution of inner surface of pores with pore sizes of less than 2 nm. This type of surface is a measure of the vitrification degree of the individual SiO₂ granulate particles. The more complete the vitrification and the more transparent the partly densified SiO₂ granulate particles the smaller is the micropore surface. However, a complete thermal densification of the individual SiO₂ granulate particles in the loose granulate bulk poses problems, for it competes with the also arising and undesired bonding of the SiO₂ granulate particles among one another, and it is also not desired with respect to an easy grindability of the granulate particles. The densification temperature is therefore preferably less than 1300° C. The granulate particles obtained in this process are not completely vitrified, but show a certain opacity or translucency which is due to at least partial micropores. If the surface of the granulate particles is vitrified and the micropores are closed, they are after all visually visible due to opacity or translucency, but they are not detected by way of BET sorption measurement. However, they manifest themselves in a considerably increased BET-(B) surface after comminution of the granulate particles. The reason is that the micropores are then evident on the broken surfaces.

It has turned out to be useful when the slip during shaping into the shaped body has a multimodal particle size distribution, with a first maximum at a particle size of less than 5 μm and a second maximum at a particle size of more than 20 μm.

In this variant of the method $SiO_2$ particles with particle sizes in the range between 1 μm and 60 μm account for the largest volume fraction of all particles in the processable slip. The $SiO_2$ particles show a multimodal particle size distribution with at least two, preferably three or more distribution maxima. A first maximum of the size distribution is in the range of about 0.5 to 5 μm, and a second maximum is in the range of 5 to 50 μm. This makes it easier to set a high solid density in the slip and a high green density, whereby shrinkage during drying and densification and thus the risk of the formation of cracks is further reduced.

Spherical granular particles basically show a comparatively good flowability. By contrast, in the case of broken $SiO_2$ particles with splintery morphology, this leads to a certain interlocking within a loose bulk, which reduces the free flowability of the loose bulk but increases the sintering activity due to the planar and not just selective contacts.

In a preferred procedure the $SiO_2$ granulate particles are partly densified prior to their use at a temperature in the range of 800° C. to 1300° C. such that the partly densified granulate has a bulk density in the range of 0.7 to 1 g/cm³.

Partial densification is preferably carried out in a chlorine-containing atmosphere. The chlorine-containing atmosphere contributes to the purification of the granulate particles. The partly densified granulate particles of synthetic $SiO_2$ are distinguished by high purity.

If the slip is exposed to vacuum prior to mold casting or prior to the application of the slip layer, possible gas-filled, large bubbles can be removed. Large bubbles may lead to comparatively large pores in the green body, which pores reduce the green strength.

The opaque quartz glass produced according to the invention is particularly suited for thermal insulation at high temperatures. It shows the properties which are also otherwise typical of and advantageous to quartz glass, for instance a low coefficient of thermal expansion, a high temperature stability and high chemical resistance to many process media. It is employed for use in semiconductor manufacture for processing semiconductor components and for optimizing heat management in process chambers. The components made of the opaque quartz glass typically have the form of reactors, apparatuses, jigs, bell jars, crucibles, protective shields or simple quartz-glass components, such as tubes, rods, plates, flanges, rings or blocks.

Definitions and Measuring Methods

Individual method steps and terms of the above description as well as measuring methods will be defined in a supplementary way hereinafter. The definitions are part of the description of the invention. In case of a content-related inconsistency between one of the following definitions and the remaining description the statements made in the description are governing.

Quartz Glass

Quartz glass means here a glass with a high silicic acid content and with an $SiO_2$ proportion of at least 90 mole %.

Granulates

A distinction can be made between build-up granulation and press granulation and in terms of the technical processes between wet, dry and freeze granulation methods. Known methods are roll granulation in a pan granulator, spray granulation, centrifugal atomization, fluidized-bed granulation, granulation methods using a granulating mill, compaction, roller presses, briquetting, flake production, or extrusion.

Discrete, rather large agglomerates, here called "$SiO_2$ granulate particles" or "granulate particles" for short, are formed during granulation by agglomerations of the $SiO_2$ primary particles. In their entirety the $SiO_2$ granulate particles form a "$SiO_2$ granulate".

Purification

The granulate or a pressed part made from the granulate is normally purified prior to sintering. The main impurities are residual water (OH groups), carbonaceous compounds, transition metals, alkali metals and alkaline earth metals that derive from the feedstock or are introduced in the processing operation. A low impurity content can already be achieved by using pure feedstock materials and corresponding equipment and processing under cleanroom conditions. To satisfy even higher demands made on purity, the granulate or the pressed part may be treated at a high temperature (up to 1200° C.) in a chlorine-containing and oxygen-containing atmosphere. Residual water evaporates in this process, organic materials react to form CO and $CO_2$ and many metals (such as for instance iron and copper) may convert into volatile, chlorine-containing compounds.

Partial Densification of the $SiO_2$ Granulate Particles

"Partial densification" refers here to a temperature treatment in which a $SiO_2$ granulate is treated at an elevated temperature of more than 800 C either in a dynamic furnace (for instance in a rotary furnace) or in a static furnace (for instance in a chamber furnace). The specific surface area (BET) is here decreasing whereas the bulk density and the mean particle size may increase due to agglomerations of granulate particles. The degree of the partial densification is determined by the temperature and the duration of the heat treatment.

Particle Size and Particle Size Distribution

Particle size and particle size distribution are characterized by way of the $D_{10}$ and $D_{90}$ values. These values are taken from particle-size distribution curves that show the cumulative volume of the $SiO_2$ particles in response to the particle size. The $D_{10}$ value marks the particle size that is not reached by 10% of the cumulative volume of the $SiO_2$ particles, and the $D_{90}$ value is thus the particle size that is not reached by 90% of the cumulative volume of the $SiO_2$ particles. The particle size distribution is determined by way of scattered-light and laser diffraction spectroscopy according to ISO 13320.

Splintery $SiO_2$ Granulate Particles

Fragments of the original granulate particles are produced during comminution of partly densified $SiO_2$ granulate. These show broken surfaces and normally a splintery, non-spherical morphology with an aspect ratio (also called "structure ratio") of at least 2. "Aspect ratio" means the ratio of maximum structure width of the broken particle of the granulate and its thickness. An aspect ratio of at least 2 therefore means that the maximum structure width is at least two times greater than its thickness.

Specific Surface Area

The specific surface area is determined by way of a sorption measurement according to the method of Brunauer, Emmet and Teller (BET method) on the basis of DIN 66132 and is based on gas absorption on the surface to be measured.

Measurement of the Pore Volume

The "pore volume" of a porous material designates the free volume occupied by voids within the material. The pore volume is for instance measured by means of a porosimeter, with a non-wetting liquid (for instance mercury) being pressed under action of an external pressure into the pores of a porous material against the counteracting surface tension forces. The force required for this is inversely proportional to the pore size and the pore size distribution of the sample can therefore be determined in addition to the total volume of the pores. Mercury porosimetry only detects pore sizes above 2 nm (mesopores and macropores).

"Micropores" are pores with pore sizes of less than 2 nm. Their contribution to porosity and specific surface area is determined on the basis of the V-t method by way of nitrogen absorption, wherein a sample is held at different pressures and 77 K. The method is similar to that of the BET method, wherein the pressure range is expanded towards higher pressures, so that surfaces of the non-microporous part of the material are also detected.

Measurement of the Green Strength

The green strength is an important value for ceramic processes for the assessment of the component stability and processability of the unsintered green body. It is determined by way of standardized laboratory samples in the three-point bending tensile test according to ISO 3995:1985. The individual sample bodies are here deformed in a test machine at a constant advance speed until the onset of the breakage, wherein the applied force per cell is determined. The respective strength value (unit: $MPa=10^6$ $N/mm^2$) follows from this after conversion from the rectangular cross-sectional area.

Figure 1:
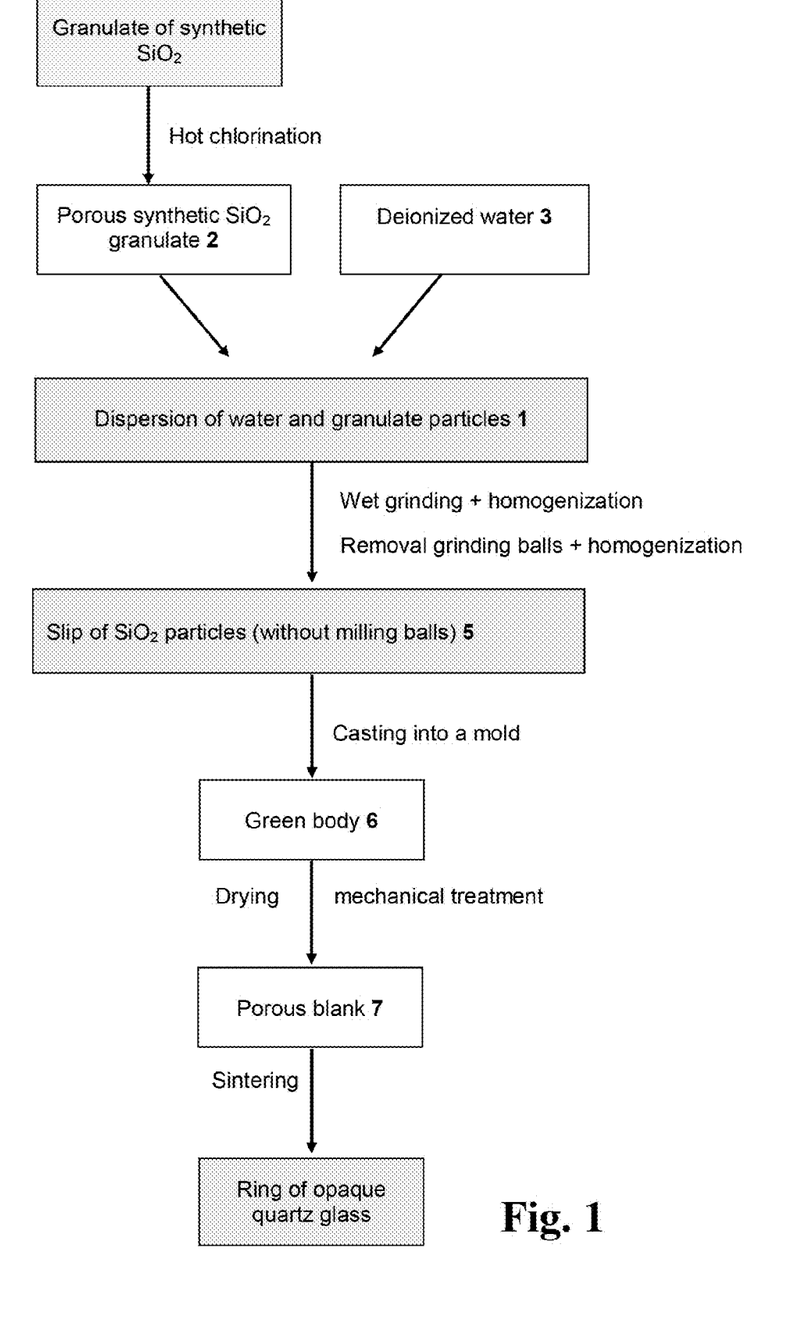
FIG. 1 is a flow diagram used for explaining the procedure according to the invention for producing opaque quartz glass.

The method according to the invention shall now be explained by way of example with reference to FIG. 1 and the manufacture of a flange of opaque quartz glass for a reactor for processing semiconductor wafers.

Synthesis of $SiO_2$ Primary Particles

The production of synthetic quartz glass is carried out by using flame hydrolysis burners which are each fed with oxygen and hydrogen as burner gases and as feedstock material for the synthesis of $SiO_2$. $SiO_2$ soot particles are formed in the form of agglomerates or aggregates of the $SiO_2$ primary particles with particle sizes in the nanometer range. The $SiO_2$ soot particles are, e.g., deposited on the outer cylinder surface of a carrier tube which is rotating about its longitudinal axis, so that a soot body is built up layer by layer. A part of the $SiO_2$ soot particles passes by way of suction into a filter system and is obtained as so-called "soot dust". This pyrogenically produced $SiO_2$ soot material of high purity is present in a particle size of less than 100 nm and typically has a specific surface area (according to BET) of more than 100 $m^2/g$ and a bulk density of about 0.1 kg/l. It is used in this method for the preparation of $SiO_2$ granulate.

Preparation of $SiO_2$ Granulate

The pyrogenically produced $SiO_2$ soot dust of high purity is here dispersed in deionized water and the synthetic $SiO_2$ granulate is produced from the dispersion by way of standard spray granulation. The $SiO_2$ granulate particles are present as agglomerate of individual spherical $SiO_2$ primary particles. The agglomerate of the $SiO_2$ primary particles is loose, so that it can be crushed and comminuted by slight mechanical pressure. Open pore channels are formed between the $SiO_2$ primary particles.

During spray granulation the spray dispersion is sprayed by using a commercially available spray dryer at a hot air temperature of 400° C. and a slip pressure of 10.5 bar. A spray granulate with a mean grain diameter of 214 μm is here obtained. The fine fraction with a diameter below 100 μm is already separated due to the manufacturing process during spray granulation by means of a cyclone. The specific surface area (according to BET) of the spray granulate is 30 $m^2/g$ and the bulk density is 0.8 kg/l. The characteristic values for the initial particle size distribution are: $D_{10}(A)$= 110 μm and $D_{90}(A)$=280 μm.

Purification and Densification of the Granulate

The $SiO_2$ granulate is subsequently pre-densified either dynamically or statically thermally.

The dynamic pre-densification is carried out in a rotary furnace in an $HCl/Cl_2$ gas mixture. In a test series the number of the treatment cycles was varied at the same maximum temperature of 1200° C., as indicated in Table 1. The mean residence time per treatment cycle is four hours. With an increasing treatment duration the specific surface area (BET) is reduced and the bulk density is slightly increasing. The characteristic values for the initial particle size distribution $D_{10}(A)$ and $D_{90}(A)$=250 μm tend to decrease because of the sinter shrinkage.

For the static pre-densification the $SiO_2$ granulate particles are received in a graphite crucible and heated up in a chamber furnace to a temperature of 1200° C. The residence time is here 36 hours. The specific surface area (BET) is here decreasing, whereas the bulk density is significantly increasing by comparison with the dynamically densified granulate particles.

For the preparation of a reference sample R of dense transparent quartz-glass granules a batch of the $SiO_2$ spray granulate is introduced into an evacuable crucible and heated in vacuum (residual pressure<2 mbar) for a holding period of four hours to a temperature of 1450° C. The completely vitrified $SiO_2$ particles are transparent and have no bubbles or few bubbles of a small size. Therefore, they appear to be transparent. Their BET surface area, the specific micropore surface and the specific external surface are the same as in the granulate particles during static pre-densification. The particle size figures for the completely vitrified granulate obtained thereby are: $D_{50}(A)$: 166 μm, $D_{10}(A)$: 120 μm and $D_{90}(A)$: 285 μm. These quartz glass granules are used as a "reference sample" for the production of a green body.

After this cleaning and sintering treatment the $SiO_2$ granulate particles are thermally densified. The individual $SiO_2$ primary particles are grown together relatively firmly by way of so-called "neck formation". The pore channels existing prior to sintering have narrowed, but they may still be permeable and at least partly open, depending on the intensity of the thermal action (sintering temperature and sintering duration).

Figure 3:
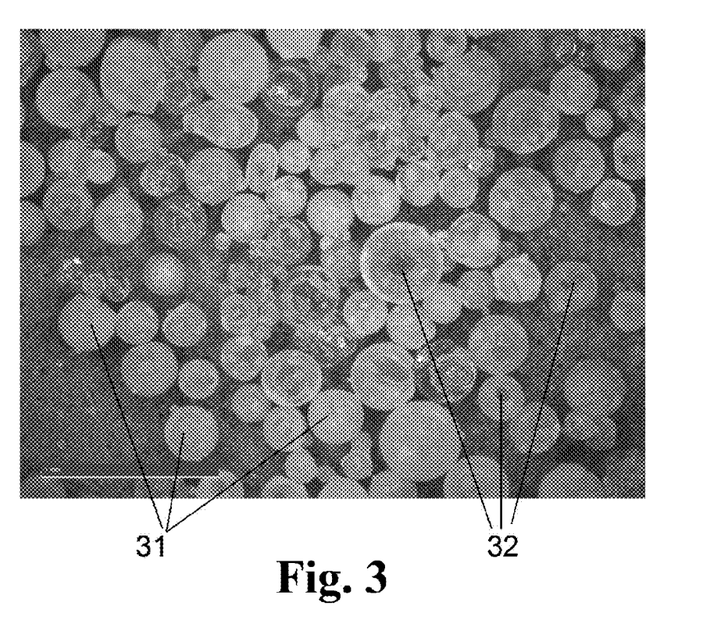
FIG. 3 is a microscopic image of partly densified spray granulate prior to comminution.

It can be seen from the photo of FIG. 3 that after the static pre-densification in the graphite crucible, the granulate grains 31 are still isolated, i.e. they are not or only slightly baked together. They have a spherical shape with an apparently monomodal particle size distribution at a diameter maximum of around 250 μm. The original void 32 of the spray granulate is clearly visible. Most of the granulate grains still include micropores and are therefore optically translucent or opaque.

Each densified granulate is characterized by its particle size distribution. Due to optimization with respect to a high green strength a two-modal particle size distribution is desired. Moreover, the specific BET surface area, the specific external surface, the specific micropore volume, the bulk density and purity were determined for each batch of the partly densified $SiO_2$ granulate. The total content of the impurities of Li, Na, K, Mg, Ca, Fe, Cu, Cr, Mn, Ti, Al, Zr, Ni, Mo and W is less than 200 wt. ppb. The impurities are determined by way of ICP-OES or ICP-MS methods. The remaining measurements results are also indicated in Table 1.

Preparation of a Dispersion (of a Slip) from the $SiO_2$ Granulate Particles

For a batch of 10 kg base slip 1 ($SiO_2$-water slip), 8.2 kg of the amorphous synthetic quartz glass granules 2 are mixed with 1.8 kg deionized water 3 with a conductivity of less than 3 µS in a drum mill lined with quartz glass and with a volume of about 20 liters.

This mixture is ground by means of grinding balls of quartz glass on a roller bracket at 23 rpm for a period of 3 days to such an extent that a homogeneous base slip 1 with a solids content of 78% is formed. In the course of wet grinding the previously thermally densified granulate particles are further comminuted, depending on their particle shape and size and their densification degree.

Subsequently, the grinding balls are removed from the base slip 1 obtained thereby and the slip is homogenized for another 12 hours. The employed $SiO_2$ granulate with the original particle size distribution D(A), marked by a $D_{10}$ value $D_{10}(A)$ and a $D_{90}$ value $D_{90}(A)$, is now crushed and ground into smaller $SiO_2$ particles. The new, final particle size distribution D(B) is characterized by a $D_{10}$ value $D_{10}(B)$ and a $D_{90}$ value $D_{90}(B)$. The proportion of the fragments of the granulate particles is indicated in Table 1 as "splintery granules". This proportion is roughly estimated with the help of a microscopic particle analysis.

The difference between $D_{90}(A)$ and $D_{90}(B)$ can be regarded as a measure of the intensity of the grinding process. The difference between $D_{10}(A)$ and $D_{10}(B)$ furnishes information on the strength of the granulate particles prior to the grinding process.

Figure 4:
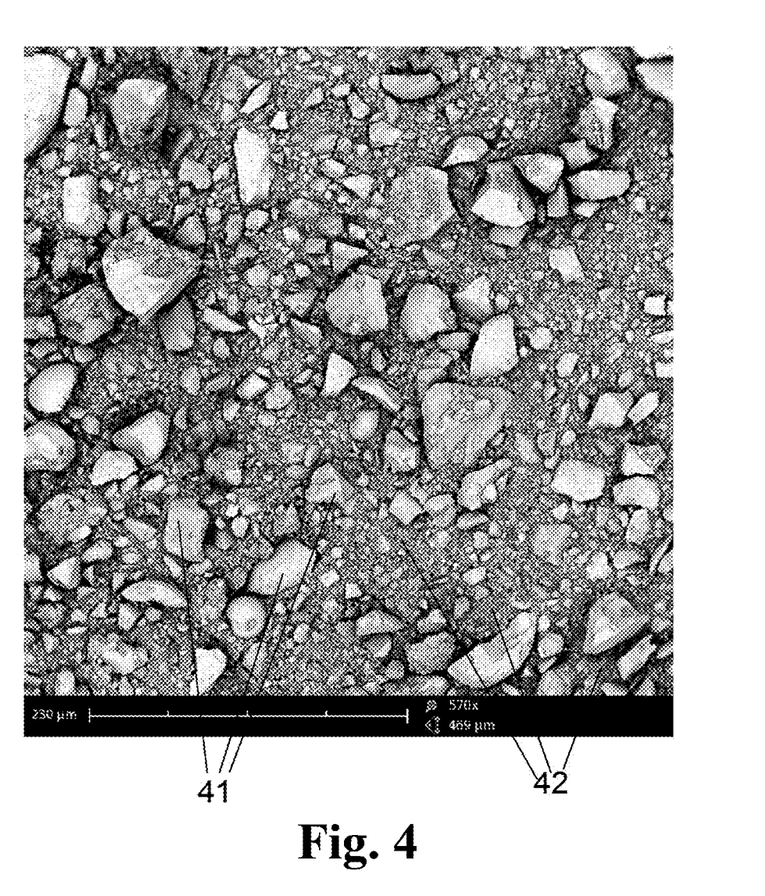
FIG. 4 is a SEM image of the partly densified spray granulate after comminution.

The SEM image of FIG. 4 shows the result of the wet grinding of the partly densified and previously spherical and largely monomodal granulate granules. After the grinding operation, almost only fragments, i.e. splintery particles 41, and a more or less homogeneous mass 42 of fine particles are visible.

After the grinding process, which is identically carried out for all granulates analyzed, a significantly increased BET value of 5.3 $m^2$/g (BET-(B)) is obtained for the statically highly densified granulate of batch no. 7 (Table 1), whereas although the vacuum-densified reference granulate "R" has an almost identical particle size distribution before and also after wet grinding (see columns 4 to 7 of Table 1), it has a BET value of just 3.8 $m^2$/g (BET-(B)) after wet grinding. Apart from the visually translucent-opaque appearance, this is experimental evidence that in the static densification the granulate is not completely densified, but still contains pores. The closed pores are partly exposed again by the grinding process, so that they can be metrologically detected in the BET measurement after the grinding process as increased BET surface area.

Preparation of a Green Body and a Porous $SiO_2$ Blank

The slip 5 is cast into a die casting mold of a commercial die casting machine and dehydrated via a porous plastic membrane to form a porous green body 6. The green body 6 has the shape of an annular flange for an RTP reactor for the treatment of wafers.

For the removal of bound water the green body 6 is dried in an aerated furnace at about 90° C. for five days and after cooling the porous blank 7 obtained is mechanically treated to almost the final dimension of the quartz glass flange to be produced. The green body obtained from undensified spray granulate showed a strength so low that neither mechanical aftertreatment nor measurements of green density and green strength were possible.

The blank 7 which is otherwise obtained as an intermediate product is present as an open-pore $SiO_2$ green body with a density of at least 1.8 g/$cm^3$. The green density values indicated in Table 1 were determined on the basis of the weight and the measurement of the pore volume by means of a porosimeter (for comparison: the specific density of transparent undoped quartz glass is about 2.2 g/$cm^3$).

It can be learned from the column "green density" of Table 1 that the advantageous minimum green density of the green body is not achieved in the granules of batches 1 to 3.

About 2 MPa (~2 MPa) are regarded as the minimum tensile strength of the green body that is required for practical use and useful for further processing. It is indicated in the column "green strength" whether this strength has been achieved in the respective batch. The low green strength of batches 0 to 4 corresponds to high values of these samples for the BET surface area, the specific external surface and the specific micropore surface of the partly densified granulates. In this respect, batches 0 to 4 are comparative examples of the invention with an insufficient partial densification.

Hence, a suitable partial densification of the $SiO_2$ granulate is just obtained in batch no. 6 and particularly in the long-term-densified batch no. 7. After the thermal partial densification these samples show very small BET surface areas of 2.5 $m^2$/g and 0.07 $m^2$/g, respectively, and a specific micropore surface of 1 $m^2$/g and less. It is only the comparatively high densification that allows an intensive comminuting process in which not only new reactive surface is created, but also fragments with a morphology, both being conducive to a dense planar agglomeration and to a mutual interlocking of the comminuted $SiO_2$ granulate particles. This planar interlocking of freshly produced broken surfaces of the $SiO_2$ granulate particles forms a kind of "house of cards structure" in the green body, which structure enables a high density of the green body (green density) and has a positive impact on the green strength.

By comparison, the reference sample from the completely densified granulate has the consequence that the grains sinter together during densification and must then be separated from one another in a more or less complicated way, which is particularly prone to contamination.

Figure 2:
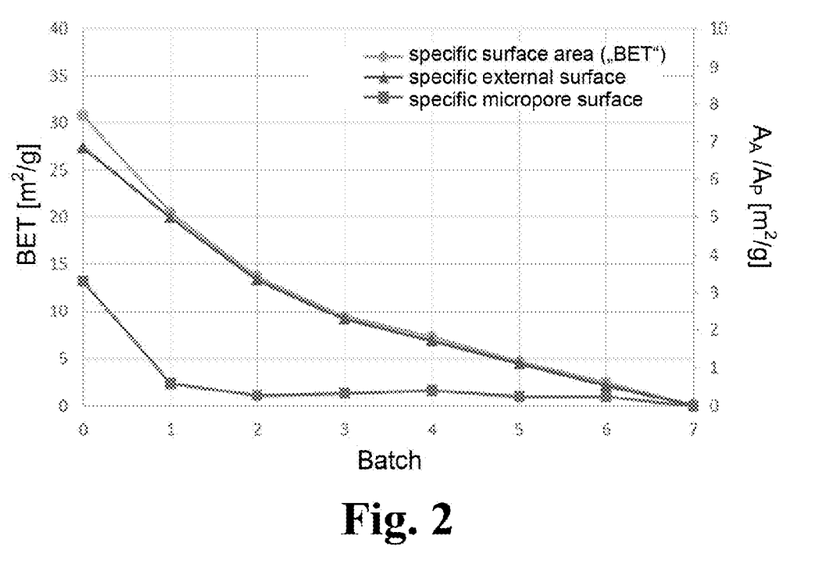
FIG. 2 is a diagram with a curve of specific surfaces of the granulates for various batches.

In the diagram of FIG. 2, the BET surface area "BET" is plotted (in $m^2$/g) on the left ordinate and the specific external surface ($A_A$) and the specific micropore surface ($A_P$) are each plotted in ($m^2$/g) for the individual batches on the right ordinate.

Preparation of a Molding from Opaque, Synthetic Quartz Glass

For sintering the blank 7, the blank is heated up in a sintering furnace in air within one hour to a heating temperature of 1350° C. and kept at this temperature for 5 h.

Cooling is carried out with a cooling ramp of 1° C./min to a furnace temperature of 1000° C. and then uncontrolled in the closed furnace.

The opaque quartz glass ring obtained thereby is ground flat, resulting in a mean surface roughness Ra of about 1 μm. The outer diameter is 400 mm, the inner diameter 300 mm and the ring thickness 50 mm. Visually, the surface appears to be white and matt. In a microscopic view onto the ground surface, a multitude of finely distributed pores are visible. The pores have maximum dimensions of less than 25 μm.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

duced with a specific surface BET-(A) in the range of 0.025 to 2.5 $m^2/g$ determined by BET sorption measurement, and (ii) wherein during the comminution of step (d), the comminuted $SiO_2$ granulate particles are produced with a specific surface BET-(B) in the range of 4 to 10 $m^2/g$ determined by BET sorption measurement.

2. Method according to claim 1, wherein during the thermal densification, the partly densified $SiO_2$ granulate particles are produced with a specific surface BET-(A) of less than 0.8 $m^2/g$ determined by BET sorption measurement.

3. Method according to claim 1, wherein the porous $SiO_2$ granulate particles prior to the comminution according to step (d) are partly densified at a temperature in the range of 800° C. to 1300° C., such that the partly densified $SiO_2$ granulate particles have a specific micropore surface of ≤0.25 $m^2/g$, which is determined by BET sorption measurement.

4. Method according to claim 1, wherein the porous $SiO_2$ granulate particles prior to the comminution according to step (d) are partly densified at a temperature in the range of 800° C. to 1300° C., such that the partly densified $SiO_2$ granulate particles have a specific micropore surface of ≤0.1, which is determined by BET sorption measurement.

5. Method according to claim 1, wherein the comminuted $SiO_2$ granulate particles have a final particle size distribution defined by a $D_{10}$ value $D_{10}(B) <5$ μm and a $D_{90}$ value $D_{90}(B)<50$ μm.

6. Method according to claim 5, wherein the comminuted $SiO_2$ granulate particles are dispersed in the dispersion with an initial particle size distribution defined by a $D_{10}$ value $D_{10}(A) >15$ μm and a $D_{90}$ value $D_{90}(A) >105$ μm.

7. Method according to claim 1, wherein at least 80% of the comminuted $SiO_2$ particles with a particle size of more than 5 μm have a splintery morphology.

TABLE 1

| Batch | Type of (partial) densification | $D_{10}$ (A) [μm] | $D_{90}$ (A) [μm] | $D_{10}$ (B) [μm] | $D_{90}$ (B) [μm] | Fraction of splintery granules % | Bulk density kg/l | BET (A) [$m^2/g$] | BET (B) [$m^2/g$] | Specif. micropore surface (BET) [$m^2/g$] | Specif. external surface (BET) [$m^2/g$] | Green density ρG [$g/cm^3$] | Green strength [MPa] |
|---|---|---|---|---|---|---|---|---|---|---|---|---|---|
| 0 | Spray tower 400° C. | 110 | 280 | | | 0 | 0.8 | 31.7 | n.d. | 3.30 | 27.4 | — | >1 |
| 1 | 1x Continuous furnace 1200° C., 4 h | 95 | 250 | 0.5 | 55 | 100 | 0.90 | 20.5 | n.d. | 0.59 | 19.9 | 1.50 | >1 |
| 2 | 2x Continuous furnace 1200° C., 8 h | 94 | 252 | 0.6 | 50 | 100 | 0.92 | 13.7 | n.d. | 0.27 | 13.4 | 1.54 | ~1 |
| 3 | 3x Continuous furnace 1200° C., 12 h | 91 | 255 | 0.8 | 50 | 100 | 0.93 | 9.5 | n.d. | 0.32 | 9.2 | 1.59 | ~1 |
| 4 | 4x Continuous furnace 1200° C., 16 h | 87 | 248 | 1.0 | 48 | 98 | 0.94 | 7.3 | n.d. | 0.40 | 6.9 | 1.63 | ~1 |
| 5 | 5x Continuous furnace 1200° C., 20 h | 84 | 245 | 1.2 | 45 | 97 | 0.96 | 4.7 | 13.8 | 0.26 | 4.4 | 1.65 | ~2 |
| 6 | 6x Continuous furnace 1200° C., 24 h | 93 | 261 | 1.5 | 44 | 95 | 0.98 | 2.5 | 9.3 | 0.25 | 2.2 | 1.66 | ~2 |
| 7 | Chamber furnace 1200° C.; 36 h | 120 | 285 | 5 | 44 | 92 | 0.99 | 0.07 | 5.3 | 0.00 | 0.07 | 1.71 | ~3 |
| R | Chamber furnace, 1450° C., 4 h, vac. | 120 | 285 | 5 | 45 | 89 | 1.20 | 0.06 | 3.8 | 0.00 | 0.06 | 1.83 | ~3 |

We claim:

1. Method for producing a pore-containing opaque quartz glass, the method comprising the steps of:
   (a) producing porous $SiO_2$ granulate particles by agglomeration of amorphous, synthetically produced $SiO_2$ primary particles,
   (b) thermally densifying the porous $SiO_2$ granulate particles to form partly densified $SiO_2$ granulate particles,
   (c) forming a dispersion containing a dispersion liquid and the partly densified $SiO_2$ granulate particles dispersed therein,
   (d) comminuting at least a part of the partly densified $SiO_2$ granulate particles in the dispersion to form a slip which contains comminuted $SiO_2$ granulate particles,
   (e) shaping the slip into a shaped body and removing the dispersion liquid to form a porous $SiO_2$ green body with a green density ρG, and
   (f) sintering the porous $SiO_2$ green body into the pore-containing opaque quartz glass,
      (i) wherein during the thermal densification of step (b), the partly densified $SiO_2$ granulate particles are pro- 8. Method according to claim 7, wherein at least 90% of the comminuted $SiO_2$ particles with a particle size of more than 5 μm have a splintery morphology.

9. Method according to claim 1, wherein the slip while being shaped into the shaped body contains $SiO_2$ particles at a weight percentage of at least 70%.

10. Method according to claim 1, wherein the slip while being shaped into the shaped body contains $SiO_2$ particles at a weight percentage of at least 75%.

11. Method according to claim 1, wherein the slip while being shaped into the shaped body has a multimodal particle size distribution, with a first maximum at a particle size of less than 5 μm and a second maximum at a particle size of more than 20 μm.

12. Method according to claim 1, wherein the porous $SiO_2$ granulate particles are produced with a bulk density in the range of 0.7 to 1 $g/cm^3$.

13. Method according to claim 1, wherein partial densification is carried out in a chlorine-containing atmosphere.

14. Method according to claim 1, wherein the slip prior to shaping into the shaped body according to method step (e) is exposed to a vacuum.

15. Method according to claim 1, wherein the green density of the porous $SiO_2$ green body is set to a value ρG in the range of $1.6<\rho G<1.9$ $g/cm^3$.

16. Method according to claim 1, wherein the production of the porous $SiO_2$ granulate particles according to method step (a) is carried out by way of spray granulation.

\* \* \* \* \*